United States Patent [19]

Bidaux

[11] Patent Number: 5,478,394
[45] Date of Patent: Dec. 26, 1995

[54] INJECTION DEVICE FOR THE TREATMENT OF WOOD

[76] Inventor: Marc Bidaux, 14, rue Ehlinger, 90400 Andelnans, France, F-90400

[21] Appl. No.: 128,876

[22] Filed: Sep. 29, 1993

[51] Int. Cl.⁶ .................................................. A01G 29/00
[52] U.S. Cl. ............................................. 118/407; 47/57.5
[58] Field of Search ................................. 118/407, 408; 47/57.5

[56] References Cited

U.S. PATENT DOCUMENTS

| 1,999,458 | 4/1935 | Hollister | 47/57.5 |
| 3,295,254 | 1/1967 | Schoonman | 47/57.5 |
| 3,834,075 | 9/1974 | Nix et al. | 47/57.5 |
| 3,968,594 | 7/1976 | Kawakami | 47/57.5 |

FOREIGN PATENT DOCUMENTS

| 0100703 | 7/1983 | European Pat. Off. . |
| 2019267 | 7/1970 | France . |
| 2175531 | 3/1972 | France . |
| 2220728 | 3/1973 | France . |
| 9204165 | 3/1992 | WIPO . |

Primary Examiner—Brenda Adele Lamb
Attorney, Agent, or Firm—Lerner, David, Littenberg, Krumholz & Mentlik

[57] ABSTRACT

An injection device is disclosed for the treatment of wood without the necessity of a rivet-set. The injection device has a deformable elastic body having an internal cavity intended to receive a conical injection head and including an anti-return valve system therein. The upper part of the body has a double wall which consists of an external wall and an internal wall. The external wall absorbs deformations due to the driving-in phase of the injection device. The internal wall insures the nondeformation of the circular ridge of the cavity to guarantee the seal between the conical injection head and the injection device during the injection phase of the treatment product.

8 Claims, 1 Drawing Sheet

INJECTION DEVICE FOR THE TREATMENT OF WOOD

BACKGROUND OF THE INVENTION

1. Field of the Invention

The present invention concerns an injector device for the treatment of wood. More particularly, the injection device is intended to be driven into a preliminary hole made in the wood to be treated.

2. Related Background Art

Various devices are used to inject a treatment product such as liquid into wood. This treatment product protects the wood against insects, fungus or other things.

The most effective are those that consist of driving into the wood, a peg-like injection device that has an internal anti-return device comprised of a clapper, a valve or a ball which, after the injection of the treatment product blocks the orifice to keep the treatment product pressurized in the wood. The injection device has an external head identical to a known greaser that exceeds the surface of the wood after the injection device is installed. Attention is called to the injection devices described in French Patents: 2,179,542; 2,220,728; and 2,386,399. A problem occurs during the installation process of these traditional devices since a special rivet-set must be utilized when the head is driven into the wood. This is primarily to prevent any deterioration of the head.

Other problems occur, with such injection devices with respect to repeated injections of treatment product. Repeated injections of the treatment product are possible only if the protruding heads are kept out from the surface of the wood to be treated. This is not always possible, especially for aesthetic reasons.

To remedy these aforementioned problems, the applicant developed an injection device described in French patent Application 2,529,820, which requires only the use of a hammer during the installation process. Therefore, no special tool such as a rivet-set is necessary. The upper part of this injection device no longer exceeds the surface of the wood to be treated after it is driven in. This injection device has an internal cavity shaped to receive a conical injection head. This solves both the problem of easy placement of the injection device and the aesthetic problem while simultaneously maintaining the possibility of subsequently accomplishing many repeated injections. This is highly desirable for effective treatment of the wood.

However, this injection device still has a problem. Due to the elasticity of the material that constitutes its core, the injection device can undergo deformation, specifically ovalization, during the driving-in-phase. Consequently, the seal between the conical head injection and the internal cavity to which it must conform is no longer assured. This results in leakage of treatment product during the injection phase which causes extrusions that are harmful to the operator.

SUMMARY OF THE INVENTION

The present invention overcomes the problems in the previous injection devices by proposing a device comprising a deformable elastic body having an internal cavity shaped to receive a conical injection head and an opening onto a hollow part that has an anti-return valve system for injecting the treatment product. The upper part of the deformable elastic body has a double wall consisting of an external wall and an internal wall. The external wall absorbs all deformations that the elastic body may incur during the driving-in phase, such that the internal wall is not deformed and always assures a perfect seal between the conical injection head and the cavity that is to receive it.

The characteristics and advantages of this invention will be better understood from reading the following description, which refers to the attached drawing, which illustrates one non-restrictive method of its realization.

Accordingly, it is an object of the present invention to provide an injection device for the treatment of wood which does not require a special tool such as a rivet-set during the installation process.

Another object is to provide an injection device that does not undergo deformation during the driving-in phase.

Still another object is to eliminate extrusions that are harmful to the operator due to treatment product leakage during the injection phase.

The above and other objects and features of the present invention will become apparent from the following detailed description and the appended claims with reference to the accompanying drawings.

In the attached drawing:

DETAILED DESCRIPTION

Figure 1:
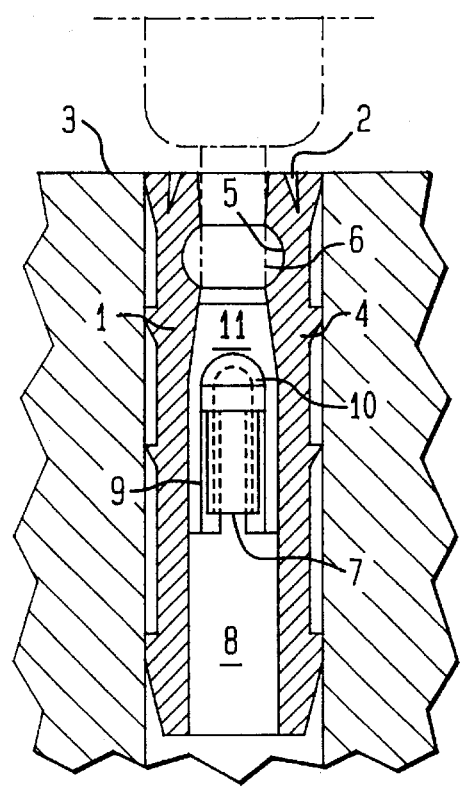
FIG. 1 is an overall view, in longitudinal cross-section, of an injection device according to the present invention, embodying the present inventive concepts.

Turning now to FIG. 1, an injection device according to the present invention has a body 1 made preferably of a polyethylene or polyamide molded plastic material. During the driving-in phase, this injection device is driven totally into a preliminary hole made in the wood to be treated. Its upper part 2 brushes the surface 3 of the wood to be treated. The injection device is forced into the wood directly using a hammer to strike the upper part 2 of the injection device. No special tool such as a rivet-set is necessary.

The external part of the body 1 has ring-shaped protuberances 4 that insure good anchoring of the injection device into the wood.

The injection device has an internal part, namely a cavity 5 intended to receive the conical injection head 6. This is designated in FIG. 2 by dotted lines. The cavity permits a pressurized injection, without leakage of the treatment product, as will be explained in greater detail below.

In a self-evident manner, the central internal part of the injection device has an anti-return valve system depicted here by a mobile piece 7 guided into a hollow cylinder 8 by appropriate ribs 9 and equipped with a semi-spherical head 10 that can come into contact with the conical part 11 of the body 1 to close the passage.

It is obvious for one skilled in the art that the anti-return valve system could consist of a clapper made by using, for example, a ball, or by any other appropriate means, without departing from the framework of the present invention.

Figure 2:
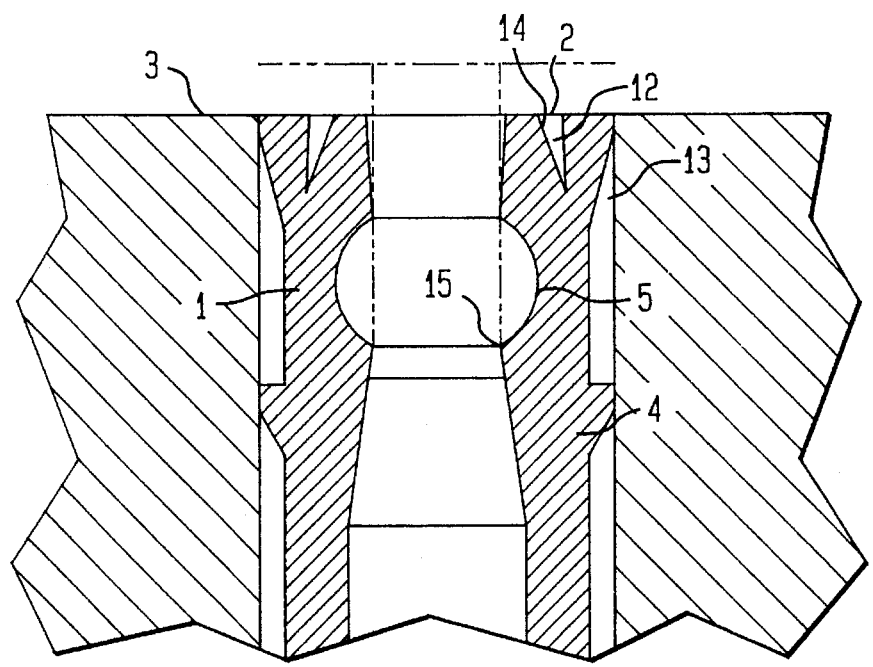
FIG. 2 is a cross-section view, on a larger scale, of the upper part of the device in FIG. 1.

Turning now to FIG. 2, it represents on a larger scale and in longitudinal cross-section, the upper part of the injection device of FIG. 1. The flared upper part of the body 1 of the injection device is divided into two independent parts by a ring-shaped groove 12 that separates an external wall 13 from an internal wall 14.

The conical injection head 6, designated by dotted lines on FIG. 2, comes to rest on the circular ridge 15 of the cavity 5 of the injection device to assure a perfect seal when the treatment product is injected. Due to the existence of the double wall created by the ring-shaped groove 12 in the upper part of the injection device, the external wall 13 which is in contact with the hole made in the wood to be treated, is subject to ovalizations or deformations that may occur due to the contact between the injection device and the hammer. The internal wall 14 is not subject to these ovalization effects. Consequently, the circular ridge 15 of the cavity 5 does not undergo any deformation due to any stresses resulting from the placement of the injection device into the wood. Thus, the conical injection head 6 is put in place, assuring a perfect seal with the injection device during the injection phase of the treatment product.

The method of operation of this improved injection device is simplified. First, the injection device is driven in with a hammer into the preliminary hole previously prepared in the wood to be treated. This occurs until the upper part 2 of the injection device brushes against the surface 3 of the wood. Next, the conical injection head 6 is introduced into the cavity 5 of the injection device. The circular ridge 15 of the cavity 5 assures a perfect seal between the cavity and the injection device. Thus, no deformation can affect the internal wall 14 of the upper part 2 since any irregularities that may occur are absorbed by the external wall 13 of the upper part.

Therefore, it is not necessary for the injection to be done rigorously in the axis of the injection device in order to preserve a perfect fit. Thus, it is possible to allow a substantially small angular tilt.

Although the invention herein has been described with reference to particular embodiments, it is to be understood that these embodiments are merely illustrative of the principles and applications of the present invention. It is therefore understood that numerous modifications may be made to the illustrative embodiments and other arrangements may be devised without departing from the scope of the present invention as defined in the appended claims.

I claim:

1. An injection device to be driven into wood for receiving an injection head for injecting a treatment product into said wood, said injection device comprising a deformable elastic body having a first end and a second end and including an internal cavity extending through said body from said first end to said second end, said first end of said body being adapted to receive said injection head and including an inner wall portion and an outer wall portion separated by an annular groove whereby said outer wall portion can absorb deformations created by driving said body into said wood, and said inner wall portion can maintain its configuration without deformation to insure the creation of a seal between said injection head and said internal cavity during injection of said treatment product, and anti-return valve means positioned in said internal cavity to prevent a return flow of said treatment product.

2. An injection device according to claim 1 wherein said body comprises molded plastic.

3. An injection device according to claim 1 wherein said outer wall portion is flared outwardly.

4. An injection device according to claim 1 wherein said internal cavity includes a circular ridge to assure said seal with said injection head during injection of said treatment product.

5. An injection device according to claim 1 wherein said body includes an outer surface including a plurality of protuberances for anchoring said injection device into said wood.

6. An injection device according to claim 5, wherein said plurality of protuberances are ring-shaped.

7. An injection device according to claim 1 wherein said internal cavity includes a conical portion and a cylindrical portion, and wherein said anti-return valve means is movably inserted within said cylindrical portion, said anti-return valve means including a plurality of ribs for guiding said anti-return valve means into said cylindrical portion and a head portion for communicating with said conical portion of said internal cavity to close said internal cavity upon the application of a return pressure thereagainst.

8. An injection device according to claim 7, wherein said head portion is semi-spherical.

* * * * *

UNITED STATES PATENT AND TRADEMARK OFFICE
CERTIFICATE OF CORRECTION

PATENT NO. : 5,478,394
DATED : December 26, 1995
INVENTOR(S) : Marc Bidaux

It is certified that error appears in the above-identified patent and that said Letters Patent is hereby corrected as shown below:

Column 1, line 53, "head injection" should read --injection head--.
Column 2, line 62, delete "it" and insert therefor --which--.
Column 4, line 38, delete "the".

Signed and Sealed this

Twenty-sixth Day of March, 1996

BRUCE LEHMAN

Attest:

Attesting Officer

Commissioner of Patents and Trademarks